(12) United States Patent
Wang et al.

(10) Patent No.: US 6,636,628 B1
(45) Date of Patent: Oct. 21, 2003

(54) ITERATIVELY CLUSTERED INTERPOLATION FOR GEOMETRICAL INTERPOLATION OF AN IRREGULARLY SPACED MULTIDIMENSIONAL COLOR SPACE

(75) Inventors: Yao Rong Wang, Webster, NY (US); Lingappa K. Mestha, Fairport, NY (US); Daniel Edgardo Viassolo, Penfield, NY (US); Sohail A. Dianat, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/487,587

(22) Filed: Jan. 19, 2000

(51) Int. Cl.[7] .................................................. G06K 9/00
(52) U.S. Cl. ........................ 382/167; 358/518; 345/604
(58) Field of Search .............................. 382/162–167; 358/504–540; 345/590–609

(56) References Cited

U.S. PATENT DOCUMENTS

| | | | | |
|---|---|---|---|---|
| 5,357,448 A | * | 10/1994 | Stanford | 358/534 |
| 5,612,902 A | | 3/1997 | Stokes | |
| 5,809,213 A | * | 9/1998 | Bhattacharjya | 358/523 |
| 6,005,970 A | * | 12/1999 | Ohneda et al. | 382/162 |
| 6,215,561 B1 | * | 4/2001 | Kakutani | 358/1.9 |
| 6,292,195 B1 | * | 9/2001 | Shimizu et al. | 345/604 |
| 6,323,969 B1 | * | 11/2001 | Shimizu et al. | 358/523 |

\* cited by examiner

*Primary Examiner*—Jingge Wu
(74) *Attorney, Agent, or Firm*—Oliff & Berridge, PLC (57) ABSTRACT

This invention provides an iteratively clustered interpolation (ICI) algorithm for use with irregularly sampled color data to develop a structured inverse. This algorithm improves device independent color across devices, such as, for example, printers, scanners and displays.

15 Claims, 4 Drawing Sheets

ITERATIVELY CLUSTERED INTERPOLATION FOR GEOMETRICAL INTERPOLATION OF AN IRREGULARLY SPACED MULTIDIMENSIONAL COLOR SPACE

BACKGROUND OF THE INVENTION

1. Field of Invention

This invention relates to color reproduction.

2. Description of Related Art

Generally, colors are represented in two ways, in device dependent color spaces and in device independent color spaces. To illustrate, most color display monitors, such as, for example, color computer monitors, display colors in the red/green/blue (RGB) color space, i.e., with respect to the amount of red, green, and blue that a particular displayed color contains. Using this technique, the color yellow, for example, is displayed on a color display monitor by combining a red image value of 100 percent red with a green image value of 100 percent green and a blue image value of zero percent.

Furthermore, the red, green, and blue (RGB) color values associated with the particular colors for a color display monitor are device dependent. This means that the RGB values associated with a particular color, viewed on a specific color display monitor, are unique to that specific color display monitor or, at least, to that brand of color display monitor. Simply put, because RGB color values are device dependent, if identical RGB color values, such as, for example, a red image value of 100 percent red, a green image value of 100 percent green, and a blue image value of zero percent, are input and displayed on two different color display monitors, the resulting yellow color displayed on the two color display monitors will probably not appear exactly alike.

Similarly, most color marking devices, such as, for example, color printers, print colors in device dependent terms. However, unlike most color display monitors, most color marking devices use a cyan, magenta, yellow, and black (CMYK) color space, i.e., a combination of cyan (C), magenta (M), yellow (Y) and black (K) (CMYK) to arrive at the color marking device's printed colors. Consequently, as with RGB color values, CMYK color values are device dependent. Thus, as described above with respect to colors being displayed on color display monitors, if identical CMYK colors are printed by two different color marking devices, the printed colors will probably not appear exactly alike.

The other way of describing color is in device independent color spaces. By describing color in a device independent color space, consistent colors can be reproduced regardless of the type of device that is used to display or print the color. Therefore, color reproduction is generally done by defining colors in a device independent color space, such as, for example, L*a*b*, X Y Z, or L h v.

In an attempt to provide accurate color matching between color display devices and color marking devices, various color matching techniques have been developed that use models to translate colors from one color space to another color space. These models usually manifest themselves in the form of predetermined multi-dimensional look-up tables. These predetermined multi-dimensional look-up tables, such as, for example, a look-up table with inputs and outputs containing more than one dimension, translate colors from one color space to another color space while attempting to maintain the translated color's perceived appearance. For example, if a user creates an image on a color display monitor and subsequently prints the created image without any color matching, the colors observed on the printed image may differ significantly from the colors originally observed on the color display monitor. However, if some type of color matching model is used, the discrepancies between the colors originally observed on the color display monitor and the colors observed on the printed image can be reduced.

Generally, to solve the problem of color matching, a printer inverse is produced for controlling colors in device dependent or device independent color spaces. Colors in the printer color space are usually in a device independent color space. The printer inverse is required to interpolate irregularly sampled multidimensional color data and is normally obtained for a particular color marking device by performing experimentation on the particular color marking device. The printer inverse is a multidimensional look-up table, preferably structured in such a way that the input nodes are regularly spaced, with the nodes located on a sequential plane.

In particular, the printer inverse is a look-up table that converts colors from device independent color spaces to device dependent color spaces, such as, for example, from L*a*b* to CMYK, or from XYZ to CMYK. For networked printers that utilize a print driver that operates in an unascertained device independent color space, the printer inverse can operate as a look-up table to convert output L*a*b* color space to input L*a*b* color space. The look-up tables are generated by measuring the printer forward transfer function between the inputs into the printer and the outputs from the printer.

For example, in a PostScript® print path, the PostScript® interpreter with colors in the XYZ/L*a*b* device independent color space becomes the input and the corresponding colors measured on a resulting color print becomes the output. The colors of the resulting color print can be measured by a color sensor, such as, for example, a spectrophotometer. The forward transfer function is then used to create the printer inverse and the associated rendering intents, such as, for example, calorimetric, pictorial/perceptual, saturation, pure, and the like.

SUMMARY OF THE INVENTION

Although the printer inverse can be generated by simply swapping the data of the forward transfer function, the data of the input grids for a printer inverse generated by merely swapping the data becomes unstructured because the output grids of the forward transfer function are unstructured. When a swapping type of printer inverse is utilized, because of the unstructured nature of the input/output (I/O) values in the swapped printer inverse look-up table, an efficient method for obtaining an effective mapping table, or printer inverse, must be used so that the relationship between the input nodes and the output nodes of the printer inverse look-up table is structured. Multidimensional interpolation is a key to obtaining such a structured mapping table.

Many techniques have been proposed for interpolating multidimensional, unstructured look-up tables. For example, Shepard's interpolation as disclosed in Donald Shepard, "A Two Dimensional Interpolation Function for Irregularly Spaced Data", ACM National Conference Proceedings, Page 517–524, 1968. Additionally, the moving matrix method as disclosed in Raja Balasubramanian, "Refinement of Printer Transformations Using Weightless Regression", Xerox Digital Imaging Technology Center, Webster, N.Y. 14580. Furthermore, master color controls (MCC) can be used to interpolate multidimensional, unstructured look-up tables, as disclosed in U.S. patent application Ser. No. 09/083,203, incorporated herein by reference in its entirety.

The incorporated 203 application discloses a method of reducing and controlling color drift between a desired image, and an output image printed by a marking device that is intended to match the desired image, by detecting a current output color in the output image with a color sensing device. A difference between the current output color in the output image and a corresponding color in the desired image is then determined. A next output color in the output image is then automatically set equal to a corrected color that minimizes the difference between the next output color and the corresponding color in the image. This is preferably done on a real-time basis.

However, Shepard's algorithm is time consuming and is not accurate when compared to other methods. Although computational time is not an issue in the moving matrix method, the range and the interpolation accuracy is relatively poor when compared to a master color controls (MCC) method. The master color controls (MCC) method uses an algorithm incorporating a purely control based technique with a multi-input/multi-output controller. The MCC method provides zero numerical interpolation errors when the printer I/O pairs are used in the computer as the model, and can lead to minimal errors in the printer inverse when used directly on the printer. However, the master color controls (MCC) method suffers from stability problems for input/output pairs near the printer gamut boundary.

There are many different multidimensional interpolation techniques that can be used to generate the printer inverse, such as, for example moving matrix, trilinear, tetrahedral, routines described in MATLAB® software, and sequential linear interpolation. The look-up table representing the printer inverse contains nodes that are usually located on a sequential grid and are uniformly spaced. These nodes must be generated using special techniques. The systems and methods of this invention provide an improved way of generating the nodes of the look-up table representing the printer inverse.

However, multidimensional interpolation is also required for those colors that are inside the gamut of the color image forming device but are not in the look-up table. That is, for colors that are not at the nodes of the look-up table. Thus, two processes must be used in the interpolation algorithms. The first processes generates a basic printer inverse using specialized algorithms, such as, for example, the algorithms shown below. The second processes interpolates any colors that are not in the look-up table.

Many of the current interpolation techniques do not provide an accurate printer inverse in a structured form for irregularly spaced color data. Although sequential linear interpolation (SLI) techniques can convert non-uniformly sampled data into the printer inverse, SLI techniques require an accurate, sequentially structured input grid. Thus, even sequential linear interpolation (SLI) techniques cannot use a totally unstructured input grid.

This invention provides an iteratively clustered interpolation (ICI) method useable with irregularly sampled color input data to develop a structured printer inverse. This iteratively clustered interpolation (ICI) method improves device independent color between devices, such as, for example, between printers, scanners and displays.

This invention separately provides iteratively clustered interpolation systems and methods that maintain consistent colors not only within one printer, but across a whole host of printers, monitors, and scanners.

This invention separately provides iteratively clustered interpolation systems and methods that describe a color in a device independent color space.

This invention separately provides iteratively clustered interpolation systems and methods that use L*a*b* as a color space standard.

This invention separately provides systems and methods that match an output L*a*b* color space with the input L*a*b* color space for colors inside a color image forming device gamut.

This invention separately provides iteratively clustered interpolation systems and methods that produce a printer inverse that is a uniformly sampled, structured look-up table with equally spaced grid points.

This invention separately provides iteratively clustered interpolation systems and methods that produce a printer inverse on a sequential plane in the input color space.

The accuracy of the proposed iteratively clustered interpolation (ICI) method is comparable to the accuracy of the master color controls (MCC) method for colors inside the printer color gamut. However, in some instances the iteratively clustered interpolation (ICI) method does not convert all of the data on or outside the boundary of the invertable regions of the color gamut of the color image forming device.

Therefore, in these instances, the iteratively clustered interpolation (ICI) method of this invention does not perform well when used directly in the printer. Thus, in various exemplary embodiments, the iteratively clustered interpolation (ICI) method is used in combination with the master color controls (MCC) method, to create a printer inverse with improved accuracy at the grid points inside the device independent color space.

The systems and methods of this invention provide an iteratively clustered interpolation (ICI) method that includes three steps. In a first step, an initial estimate of the printer inverse is obtained for a given set of device independent L*a*b* color values using a clustering interpolation method. The initial estimate of the printer inverse is refined using a gradient search method to improve the accuracy of the initial estimate. If the inversion of a particular color does not yield an acceptable inverse after the printer inverse is refined, the second step of the iteratively clustered interpolation (ICI) method is invoked. In a second step of the iteratively clustered interpolation (ICI) method, the initial estimate is changed appropriately and the gradient search method is applied again for this new initial estimate point. If the second step of the iteratively clustered interpolation (ICI) method fails to produce an acceptable inverse, a third step is used. In the third step of the iteratively clustered interpolation (ICI) method, the initial estimates of the printer inverse are changed by a method similar to a simulated annealing algorithm. Once the initial estimates are changed, the gradient search is used again. Thus, by using the three steps of the iteratively clustered interpolation (ICI) method outlined above, an improved printer inverse can be produced for almost any color, provided that the color is within the printer gamut. If a particular color is on or outside the printer gamut, a color inverse does not exist for that particular color.

Gamut mapping techniques not disclosed in herein can be used to map the colors outside the color gamut of the color marking device to colors inside the color gamut of the color marking device based on the specific rendering intents.

These and other features and advantages of this invention are described in or are apparent from the following detailed description of various exemplary embodiments of the systems and methods of this invention.

BRIEF DESCRIPTION OF THE DRAWINGS

Exemplary embodiments of the systems and methods according to this invention will be described in detail, with reference to the following figures, wherein.

DETAILED DESCRIPTION OF PREFERRED EMBODIMENTS

For simplicity and clarification, the operating principles, design factors, and layout of the iteratively clustered interpolation systems and methods according to this invention are explained with reference to various exemplary embodiments of iteratively clustered interpolation systems and methods according to this invention. The basic explanation of the operation of the iteratively clustered interpolation system is applicable for the understanding and design of the constituent components employed in the iteratively clustered interpolation systems and methods of this invention.

Figure 1:
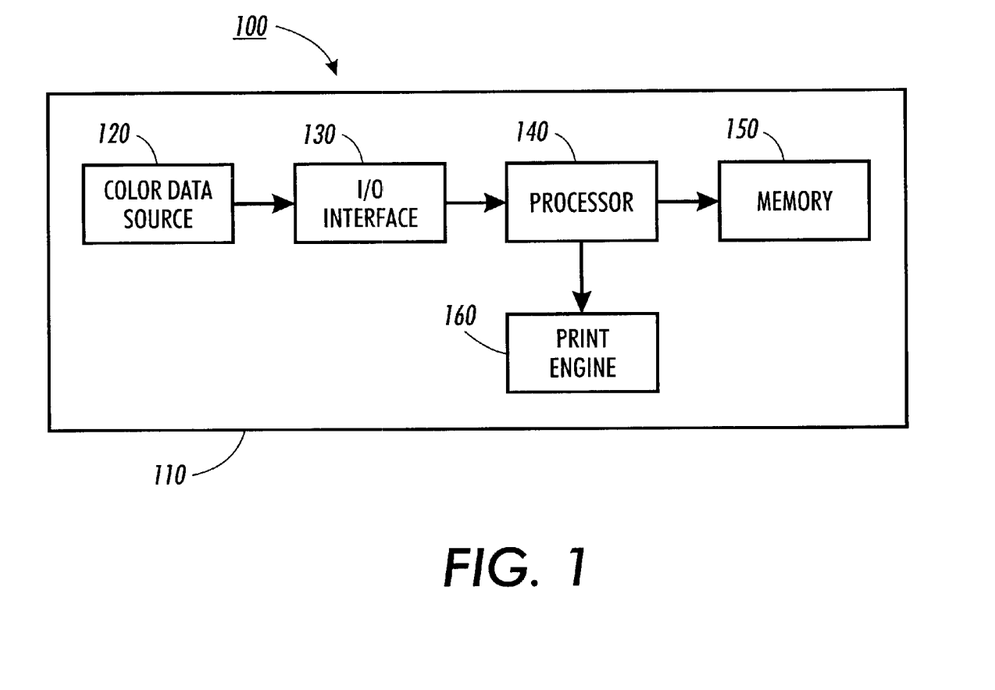
FIG. 1 is a functional block diagram outlining the functional units of an exemplary color image forming device.

FIG. 1 is a functional block diagram outlining the functional units of an exemplary color image forming device 110, such as, for example, a color printer, which will be used to describe a first exemplary embodiment of an iteratively clustered interpolation system 100 according to this invention. As shown in FIG. 1, the exemplary color image forming device 110 includes a color data source 120, an input/output interface 130, a processor 140, a memory 150, and a print engine 160. The processor 140 coordinates the activities of the color image forming device 110.

The input/output interface 130 receives color data from a color data source 120. The color data source 120 can be a locally or remotely located desktop or laptop computer, a personal digital assistant (PDA), a scanner, a facsimile machine, a digital camera, or a device suitable for storing and/or transmitting electronic color data, such as a client or server of a network, or the Internet, and especially the World Wide Web, or any other presently known or later developed device that is capable of supplying color data to the exemplary color image forming device 110.

The input/output interface 130 can be any known or later developed device or system for connecting the exemplary color image forming device 110 to the color data source 120, including a direct wired connection, a connection over the public switched telephone network, a connection over a coaxial cable (i.e., CATV) system, a connection over a cellular telephone network, a satellite connection or the like. In general, the input/output interface 130 can be any known or later developed connection system or structure usable to connect the exemplary color image forming device 110 to the color data source 120, including both wired and wireless connections.

The memory 150 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

During operation of the color image forming device 110, the input/output interface 130 receives input color data indicating that certain colors are to be printed. The input color data is described in the L*a*b* device independent color space. Once the input color data is received by the input/output interface 130, the input color data is transferred to the processor 140.

However, for the color image forming device 110 to produce an optimal color image output, the input color data must be adjusted before the input color data is sent to the print engine 160. Therefore, when the processor 140 receives the input color data, the processor 140 retrieves corresponding compensation values for the input color data from a three-dimensional look-up table stored in the memory 150. Thus, using the multidimensional look-up table stored in the memory 150, the processor 140 provides compensated color data to the print engine 160. In this manner, the printed output of the color image forming device 110 has the desired color characteristics, such as, for example, brightness, hue, and contrast. This invention relates to systems and methods for creating the multidimensional look-up table mentioned above.

The systems and methods of this invention provide an iteratively clustered interpolation (ICI) method that includes three steps. In a first step, an initial estimate of the printer inverse is obtained for a given set of device independent L*a*b* color values using a clustering interpolation method. The initial estimate of the printer inverse is refined using a gradient search method to improve the accuracy of the initial estimate. If the inversion of a particular color does not yield an acceptable inverse after the printer inverse is refined, the second step of the iteratively clustered interpolation (ICI) method is invoked. In a second step of the iteratively clustered interpolation (ICI) method, the initial estimate is changed appropriately and the gradient search method is applied again for this new initial estimate point. If the second step of the iteratively clustered interpolation (ICI) method fails to produce an acceptable inverse, a third step is used. In the third step of the iteratively clustered interpolation (ICI) method, the initial estimates of the printer inverse are changed by a method similar to a simulated annealing algorithm. Once the initial estimates are changed, the gradient search is used again. Thus, by using the three steps of the iteratively clustered interpolation (ICI) method outlined above, an improved printer inverse can be produced for almost any color, provided that the color is within the printer gamut. If a particular color is on or outside the printer gamut, a color inverse does not exist for that particular color.

Figure 2:
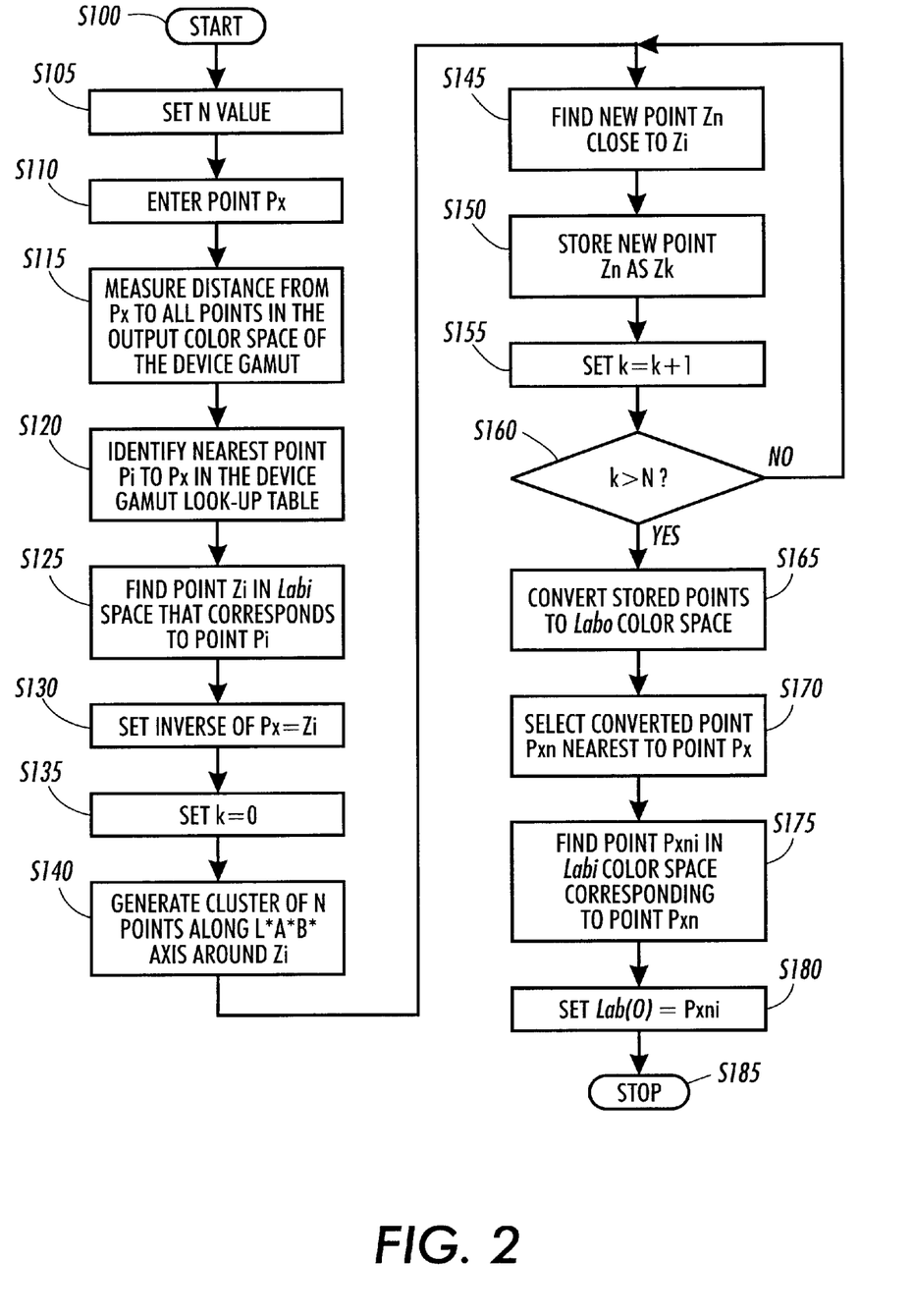
FIG. 2 is a flowchart outlining one exemplary embodiment of a method for obtaining an initial estimate of the printer inverse of an arbitrary point $P_x$ in an output space according to this invention.

FIG. 2 is a flowchart outlining one exemplary embodiment of a method for obtaining an initial estimate Laby(o) of the printer inverse of an arbitrary point $P_x$ in an output space according to this invention. In various exemplary embodiments, the forward printer model converts color values in an input Labi color space to color values in an output Labo color space. In various exemplary embodiments, the forward printer model converts color values in an input Labi color space to color values in an output Labo color space by performing input/output experiments on a color marking device. The Labi color space is uniformly sampled because the sampling method can be chosen as a uniformly sampling method while the experiments are being performed on the color marking device. Thus, the Labi color space is a uniformly sampled input to the look-up table of the forward printer that has uniformly spaced grids.

The Labo color space is an output color space that is actually measured on the color marking device with non-uniformly spaced grids corresponding to the Labi color space. Points in the input Labi color space are uniformly spaced and form a perfect cube. Thus, the forward interpolation process from the Labi color space to the output Labo color space is more efficient and accurate than interpolation processes that use input color spaces that are not uniformly spaced and do not form a perfect cube. In various exemplary embodiments, methods such as the tetrahedral or trilinear interpolation methods are used for the forward interpolation process.

As shown in FIG. 2, beginning in step S100, control continues to step S105, where a value for the number of points N to be generated to improve the initial estimate is set. Then, in step S110, an arbitrary point $P_x$ in the Labo color space is chosen. Control then continues to step S115.

In step S115, the distance from $P_x$ to all points in an output color space of a device gamut is measured. Then, in step S120, a point $P_i$ is identified. $P_i$ is the point in the look-up table that is nearest to the point $P_x$. Next, in step S125, a point $Z_i$ is found. The point $Z_i$ is a point in the Labi color space that corresponds to the identified point $P_i$. Additionally, the point $Z_i$ is a grid point in the input space of the printer look-up table P. Control then continues to step S130.

In step S130, the point $Z_i$ is set as a coarse estimate of the inverse to $P_x$. Then, in step S135, a count number k is set to zero. Next, in step S140, a cluster of N points is generated along the L*, a*, and b* axis around the point $Z_i$. Control then continues to step S145.

In step S145, a new point Zn is found in the cluster of N points along the L*, a*, and b* axis around the point $Z_i$. Control continues to step S150.

In step S150 the new point Zn is stored as Zk. Then, instep S155, the count number k is set equal to k+1. Next, in step S160, a determination is made whether the count number k is greater than N. If the count number k is not greater than to N, control returns to step S145. Otherwise, control advances to step S165.

In step S165, points in the Labo color space corresponding to the points stored in step S150 are determined. These determined points in the Labo color space form a cluster around the point $P_x$. In various exemplary embodiments, a linear interpolation algorithm is used to calculate the points. Next, in step S170, a nearest converted point $P_{xn}$ to the point $P_x$ in the cluster of converted points around the point $P_x$ is selected. Then, in step S175, a point $P_{xni}$ in the Labi color space is found corresponding to the selected nearest converted point $P_{xn}$ in the cluster around the point $P_x$. Control then advances to step S180.

In step S180, the selected nearest converted point $P_{xn}$ in the Labi color space is set as the initial estimate Laby(o) of the inverse of $P_x$. Control then advances to step S185, where the method ends.

Figure 3:
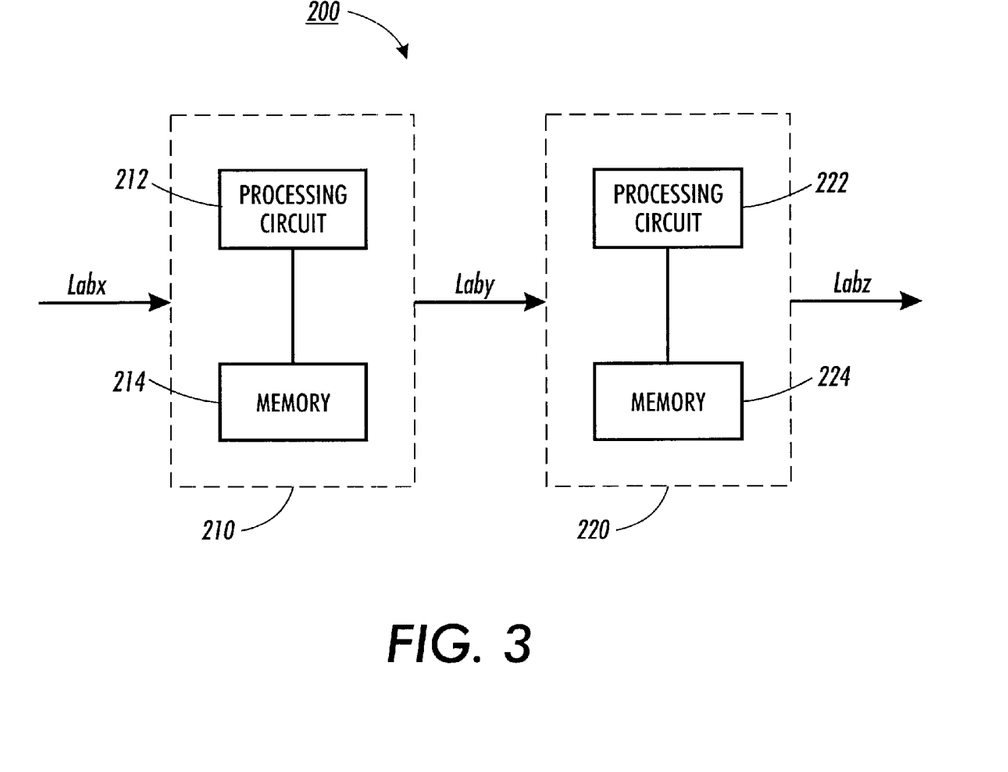
FIG. 3 is a functional block diagram showing a first exemplary embodiment of the iteratively clustered interpolation systems according to this invention, which is used to determine the accuracy of a look-up table before the look-up table is used in a printing system.

FIG. 3 shows a functional block diagram of one exemplary embodiment of an iteratively clustered interpolation (ICI) system 200 according to this invention. The iteratively clustered interpolation (ICI) system 200 is used to detect the accuracy of the gradient search algorithm outlined below. As shown in FIG. 3, the iteratively clustered interpolation (ICI) system 200 includes an inverse printer model 210 and a forward printer model 220. The inverse printer model 210, which is represented by $P^{-1}$, represents a smooth inverse printer function defined through a uniformly sampled look-up table. The inverse printer model 210 contains a first processing circuit 210 connectable to a first memory 214. The forward printer model 220, which is represented by P, represents a smooth forward printer function defined through a uniformly sampled look-up table. The forward printer model 220 contains a second processing circuit 222 connectable to a second memory 224.

The first memory 214 contains an inverse printer function defined through a uniformly-spaced look-up table. The second memory 224 contains a printer function defined through a uniformly-spaced look-up table. The first memory 214 and the second memory 224 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

During operation of the iteratively clustered interpolation (ICI) system 200, the inverse printer model 210 receives an input described in Labx color values. Using the first memory 214, the first processing circuit 212 converts the input Labx color values into a smooth inverse printer function represented by Laby. The Laby color values represent the output of the inverse printer model 210 and contain output L*a*b* values not in the look-up table stored in the first memory 214.

Once the inverse printer model 210 creates the Laby color values, the inverse printer model 210 passes the Laby color values to the forward printer model 220. When the forward printer model 220 receives the Laby color values, the second processing circuit 222 uses the second memory 224 to convert the input Laby color values into Labz color values.

If the inverse of the printer model is exact, the Labz color values output by the forward printer model 220 will be the same as Labx color values input into the inverse printer model 210 for all invertible colors within a color image forming device gamut.

In various exemplary embodiments, one method for quantifying the accuracy of the inverse of the printer model 210 is by calculating a colorimetric quantity ΔE. ΔE represents the difference between the input Labx color values and the output Labz color values. Thus, ΔE can be used to judge the accuracy of the iteratively clustered interpolation (ICI) system 200 for all color values selected on the input grid.

If an initial estimate Laby(0) is obtained using the clustering interpolation method described above, with reference to FIG. 2, to obtain the point Laby, corresponding to the point Labx in the printer inverse look-up table, the mean square error between the Labx color value input to the inverse printer model 210 and the Labz color value output from the forward printer model 220 is minimized. In various exemplary embodiments, the Laby color value is updated by computing a gradient of the point Labz with respect to the point Laby using the least mean square (LMS) recursive equation shown below.

$$\text{Laby}(k+1) = \text{Laby}(k) - \mu * \beta(k) * (\text{Labz}(k) - \text{Labx})$$

Where:

Laby (k) is the vector $[L^*(k)\ a^*(k)\ b^*(k)]'_y$ and the single quote denotes the transpose;

Labz (k) and Labx represent the $L^*a^*b^*$ vector at the corresponding points;

$\beta$ (k) is a 3×3 matrix that is the Jacobian of Labz (k) with respect to Laby (k);

$\mu$ is a constant; and k is the iteration number localized to the gradient search algorithm described above.

The 3×3 matrix $\beta$ (k) can be evaluated from a printer model using linear interpolation and numerical differentiation.

The quantity $\mu$ controls the convergence rate of the gradient search algorithm. A larger value for $\mu$ give faster convergence and also meets the accuracy requirement. Large $\mu$ will give faster convergence, but will increase the mean square error. Thus, an appropriate value for $\mu$ must be selected to meet the accuracy requirement. In various exemplary embodiments, a value of 0.3 is used for $\mu$.

While a large portion of the invertible gamut can be determined from the gradient search method together with a starting point of the search provided by the clustering interpolation method, there are invertible points in the gamut that are not captured by this approach. This is due to the fact that the mean square error function that is minimized has local minimums. A gradient search method with the above starting point will only converge to the local minimum.

To remedy this, in various exemplary embodiments, a starting point for the gradient search is chosen such that Laby (k=o)=Labx. This starting point is useful for colors near the center of the device gamut where the input/output relation is linear with the Jacobian close to identity.

Alternatively, a starting point for the gradient search is chosen using an approach similar to the simulated annealing method such that Laby (k=1)=(1+α) Laby(o), where Laby (o) is the estimated point for the clustering interpolation method. In various exemplary embodiments, α=0.25 is used for estimating the printer inverse within the device gamut.

The three starting points, together with the gradient search method described above, covers all the possible invertable points of the device gamut. A flowchart in FIG. 4 shows the data flow through the various steps described above.

Figure 4:
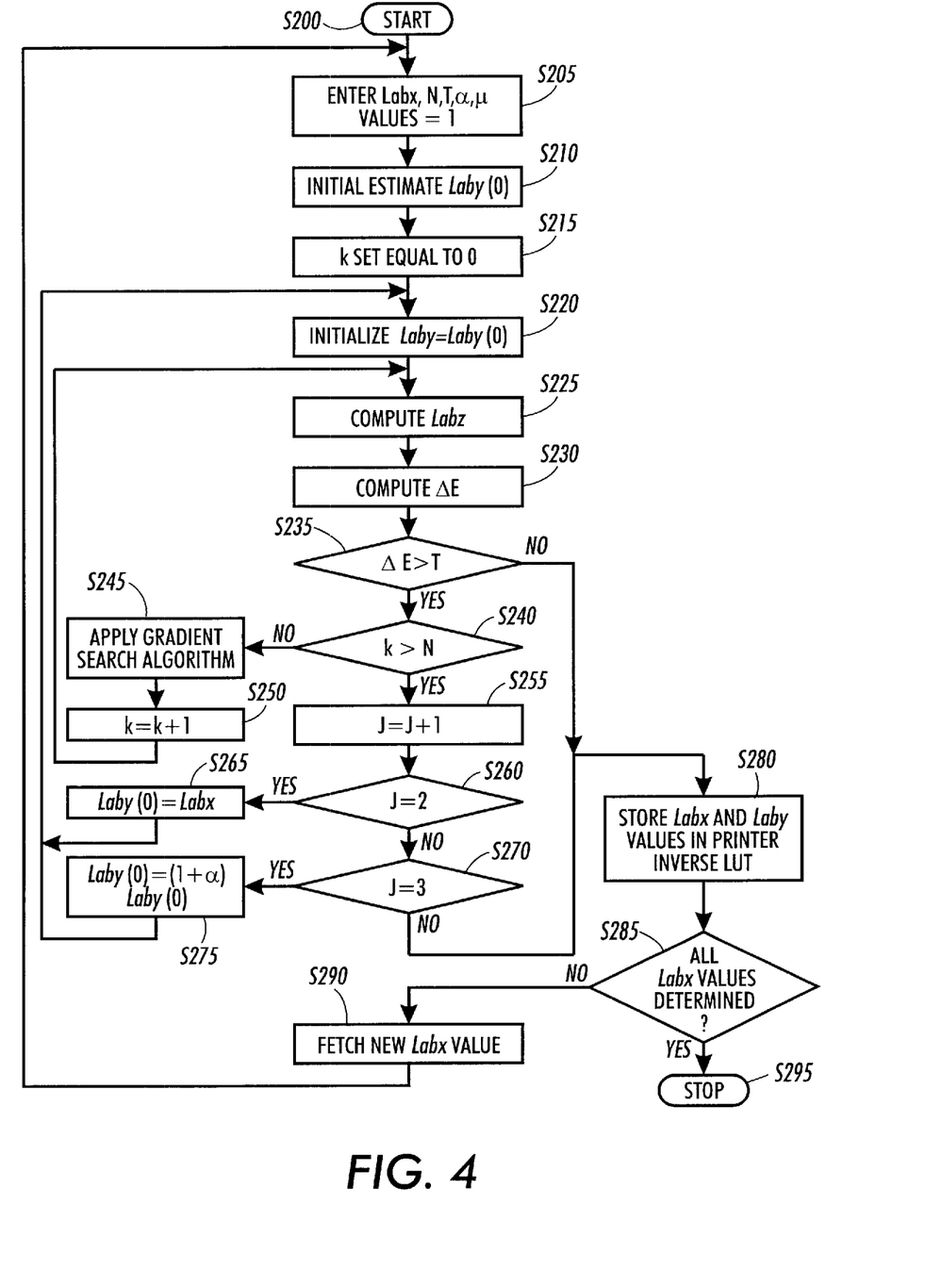
FIG. 4 is a flowchart outlining one exemplary embodiment of the iteratively clustered interpolation method of this invention.

FIG. 4 is a flowchart outlining one exemplary embodiment of a method for enabling iteratively clustered interpolation according to this invention. Using the method outlined in FIG. 4, the user can generate a multi-dimensional look-up table that gives the user a printer inverse look-up table with improved accuracy. In FIG. 4, the method can begin as part of a color warrantee option or, alternatively, by the user initiating the iteratively clustered interpolation methods of this invention.

As shown in FIG. 4, beginning in step S200, control continues to step S205, where values for Labx, N, T, α, and $\mu$ are input and J is set equal to one. As described above, the Labx color values represent a uniformly sampled input, the inverse of which is to be determined. Additionally, N is a desired iteration number threshold, T is a threshold for the ΔE value, α is a coefficient for initialization in the third step, as described above, $\mu$ is an adaptation coefficient for the gradient search described above and J is the present step number. Control then continues to step S210.

In step S210, an initial estimate of the printer inverse Laby(0) is obtained for a given set of $L^*a^*b^*$ color values using a clustering interpolation method. In various exemplary embodiments, the clustering interpolation method described in FIG. 2 is used to obtain the initial estimate of the printer inverse Laby(0). Next, in step S215, the iteration number k is set equal to 0. Then, in step S220, the Laby color value is set equal to the initial estimate Laby(0) of the printer inverse obtained in step S210. Control then advances to step S225.

In step S225, values for the Labz color values are determined from the Laby color values. Control then advances to step S230

In step S230, a ΔE value is determined for the current Labx and Labz color values as described above. Then, in step S235, a determination is made whether the determined ΔE value is greater than the input T value. If, in step S235, the determined ΔE value is not greater than the input T value, control jumps to step S280. Otherwise, control advances to step S240.

In step S240, a determination is made whether the present iteration number k is greater than the desired iteration number N. If, in step S240, the present iteration number k is not greater than the desired iteration number N, control jumps to step S245. Otherwise, control advances to step S255.

In step S245, a gradient search algorithm is applied to determine Laby. In various exemplary embodiments, the gradient search algorithm described above is applied. Next, in step S250, the iteration number k is incremented by one. Control then returns to step S225.

In step S255, the present step number J is incremented by one. Then, in step S260, a determination is made whether the present step number J equals two. If, in step S260, the present step number J equals two, control advances to step S265. Otherwise, control jumps to step S270.

In step S265, Lab(o) is set equal to Labx. Control then returns to step S220.

In step S270, a determination is made whether the present step number J equals three. If, in step S270, the present step number J equals three, control advances to step S275. Otherwise, control jumps to step S280.

In step S275, Lab(o) is set equal to (1+α) Lab(o) where a is a scalar constant. Control then again returns to step S220. In contrast, in step S280, the present values for Labx and Laby are stored. In various exemplary embodiments, the present values for Labx and Laby are stored in a printer inverse look-up table. Control then advances to step S285.

In step S285, a determination is made whether all of the values for Labx have been determined. If, in step S285, all of the values for Labx have not been determined, control jumps to step S290. In step S290, a new value for Labx is obtained. Control then returns to step S205.

If, in step S285, all of the values for Labx have been determined, control jumps to step S295 and the method ends.

The systems shown in FIGS. 1 and 3 and/or the methods outlined above in FIGS. 2 and 4 can be implemented on a general purpose computer, a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 3 and 4, can be used to implement the methods described above.

It should be appreciated that any other known or later developed image forming device that produces color output documents could be modified to incorporate the iteratively clustered interpolation systems and methods described herein.

Moreover, the iteratively clustered interpolation systems and methods described herein can be implemented as software executing on a programmed general purpose computer, a special purpose computer, a microprocessor or the like. In this case, the iteratively clustered interpolation systems and methods described herein can be implemented as a routine embedded in a printer driver, as a resource residing on a server, or the like. The iteratively clustered interpolation systems and methods described herein can also be implemented by physically incorporating them into a software and/or hardware system, such as the hardware and software systems of a printer or a digital photocopier.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for interpolating irregularly spaced multidimensional color data to provide an improved color device inverse, comprising:

estimating an initial estimate point of a device inverse for a given set of input color values;

refining the initial estimate point of the device inverse corresponding to the input color values;

determining an inverse of the initial estimate point of the device inverse;

comparing the device color to the input color values;

changing the initial estimate point of the device inverse to a corresponding output color space of a color image forming device if the inversion of a particular color does not yield an acceptable inverse after refining the initial estimate point of the device inverse; and repeating the refining, determining, comparing, and changing steps using the changed initial estimate point until the inversion of a particular color yields an acceptable inverse.

2. The method of claim 1, wherein the input colors are in a device independent color space.

3. The method of claim 1, wherein the input colors are in a device dependent color space.

4. The method of claim 1, wherein the color device is at least one of a color marking device, a color display monitor, or a color scanner.

5. The method of claim 1, wherein estimating the initial estimate point includes estimating the initial estimate point using a clustering interpolation method.

6. The method of claim 5, wherein estimating the initial estimate point using the clustering interpolation method comprises:

identifying an arbitrary output point in an output device color space of a device gamut;

identifying a nearest output point, in a look-up table, to the arbitrary output point in the output color space of the device gamut;

identifying a corresponding input point, in a look-up table, in a uniformly sampled input color space of the device gamut, corresponding to the identified nearest output point;

using the identified corresponding input point as a coarse estimate point of the inverse of the arbitrary output point;

improving the coarse estimate point of the inverse of the arbitrary output point by generating a cluster of N different points on the L*a*b* axis, around the coarse estimate point;

determining points in the output color space of the device gamut corresponding to the N different points such that the determined points form a cluster of output points around the arbitrary output point;

identifying the nearest determined output point in the cluster of output points to the arbitrary output point;

selecting the input point corresponding to the identified nearest determined point in the cluster of output points; and using the selected corresponding input point as the initial estimate point.

7. The method of claim 6, wherein finding the nearest point to the arbitrary point in the output color space includes determining the distance from the arbitrary point to all points in the output color space of the device gamut.

8. The method of claim 6, wherein determining points in the output color space includes using a linear interpolation algorithm.

9. The method of claim 1, wherein refining the changed initial estimate point includes applying a gradient search method to improve the accuracy of the initial estimate point.

10. A system for determining the accuracy of a determined irregularly spaced multidimensional color look-up table, comprising:

an inverse printer model defined through a uniformly sampled look-up table that converts a color input Labx in L*a*b* color space into output color values Laby including color values not in the look-up table; and a forward printer model defined through a uniformly sampled look-up table that converts input color values Laby into corresponding output color values Labz.

11. The system of claim 10, wherein the inverse printer model uses iteratively clustered interpolation to provide an improved color inverse.

12. The system of claim 10, wherein the output color values Laby of the inverse printer model are defined in a device dependent color space.

13. The system of claim 10, wherein the input color values Laby of the forward printer model are defined in a device dependent color space.

14. The system of claim 10, wherein the output color values Laby of the inverse printer model are defined in a device independent color space.

15. The system of claim 10, wherein the input color values Laby of the forward printer model are defined in a device independent color space.

* * * * *